United States Patent [19]
van den Hove et al.

[11] 3,733,049
[45] May 15, 1973

[54] DETERMINATION OF YIELD ELONGATION DURING TENSILE TESTING

[75] Inventors: Christian van den Hove, Bressoux; Lucien Renard, Liege, both of Belgium

[73] Assignee: Centre National De Recherches Metallurgiques, Brussels, Belgium

[22] Filed: Mar. 4, 1971

[21] Appl. No.: 121,104

[30] Foreign Application Priority Data

Mar. 5, 1970 Belgium..............................746930

[52] U.S. Cl. .....................235/151.3, 73/88, 235/184
[51] Int. Cl. ..........................G06g 7/24, G01b 7/16
[58] Field of Search...................235/151.3, 185, 184, 235/197; 73/88.5 R, 88 R

[56] References Cited

UNITED STATES PATENTS

| | | | |
|---|---|---|---|
| 3,558,866 | 1/1971 | Poulson | 235/151.3 |
| 3,095,732 | 7/1963 | Macgeorge | 73/88 R |
| 3,477,286 | 11/1969 | Baker | 73/88.5 R |
| 3,474,237 | 10/1969 | Hastings | 235/151.3 |

*Primary Examiner*—Malcolm A. Morrison
*Assistant Examiner*—Edward J. Wise
*Attorney*—Holman & Stern

[57] ABSTRACT

The load, elongation, and width transducers of a tensile test machine are connected to an array of analog calculation elements arranged to calculate the yield elongation.

9 Claims, 1 Drawing Figure

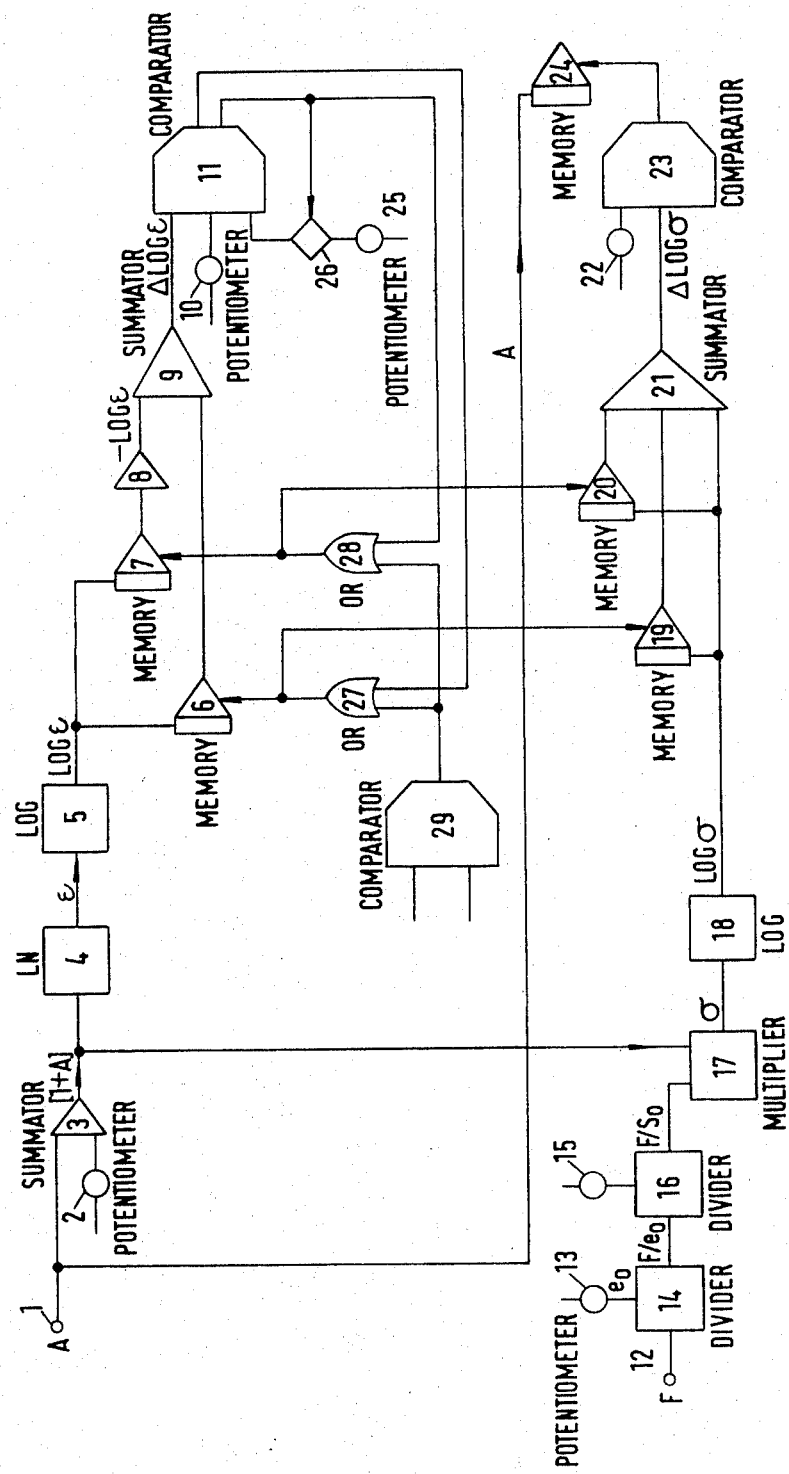
INVENTOR
CHRISTIAN VAN DEN HOVE ETAL

DETERMINATION OF YIELD ELONGATION DURING TENSILE TESTING

The present invention relates to the determination of the properties of metallic substances, such as steel, and in particular the yield elongation.

It is usual to investigate these properties by subjecting the metal to a tensile test. In this test a testpiece is subjected to a gradually increasing longitudinal tensile force, and various data such as the elongation of the gauge length, the load, and the variation in width are detected by transducers. These data are transmitted to an array of electronic modules, built up in particular from analog calculation elements, and the signals delivered by this array are transmitted to devices, for example recorders, from which the values of the properties required can be obtained.

The following properties can be determined in this manner:

1. proof stress at $x$ percent elongation, $x$ varying from 0.01 to 0.2 ;
2. the upper and lower yield stress;
3. the work-hardening index $n$ ;
4. the maximum stress and the elongation corresponding to this maximum stress; and
5. the normal anisotrophy coefficient $r$.

It is apt to note that these results may be obtained without having to resort to a special traction mechanism, but simply by adapting the traction mechanisms commonly employed at present.

However, until now it has not been possible to determine the length of the yield elongation with satisfactory precision. Knowledge of this property is important for the complete utilization of the properties of metallic substances. Until now a determination of this kind has been left to the care and skill of the operator observing a needle displaced over a graduated screen, and the stress-strain curve graph. The results thus obtained are essentially subjective, varying from one operator to another and affected by the unavoidable errors inherent in a method of this kind.

In the case of the stress-strain curve, the major disadvantage is that the operator cannot precisely observe the difference in the gradient of the curve, which gives rise to varying interpretations of the end of the yield elongation range and thus of the length of this range. Another shortcoming derives from the fact that the substances examined are commonly produced in considerable quantity, which imposes the need for a very great number of determinations to be performed at a rate which a man is practically unable to sustain.

The process of the present invention is based on the fact that the rational tensile curve may be written in the form of an equation of the type:

$$\sigma = k \, \epsilon^n ,$$

where

1. $\sigma$ is the true stress applied to the testpiece, that is to say $\sigma = F/S$, in which S is the minimum cross-sectional area of the testpiece exposed to the load F;
2. $\epsilon$ is the value of the corresponding deformation, the true strain, that is to say $\epsilon = \ln(L/L_o)$, in which $L_o$ is the gauge length of the testpiece;
3. $K$ is a constant for the material; and
4. $n$ is the work-hardening index.

In the case in which the rational tensile curve is plotted in logarithmic co-ordinates (ln $\sigma$ as ordinates and ln $\epsilon$ as abscissae), beyond the elastic range the force increases more slowly than the elongation, and particularly in the case of mild steels, a yield elongation is observed whose termination is distinctly clearer than on the conventional tensile curve and can thus be determined with more precision.

As for the logarithmic values of the true stress ($\sigma$) applied to the testpiece and the corresponding deformation ($\epsilon$) the symbol "log" will be employed in the present text, and it should be understood that this "log" symbol covers logarithms to any base including natural or Napierian Logarithms, commonly indicated by the symbol "ln".

The invention provides a process for determining the yield elongation of a metallic substance, comprising a. subjecting a testpiece of the substance to a tensile test;
b. continuously measuring the elongation, load, and width of the testpiece;
c. continuously calculating the true stress, $\sigma$, and the true strain, $\epsilon$ ;
d. continuously calculating log $\sigma$ and log $\epsilon$ ;
e. continuously calculating simultaneous increments $\Delta \log \sigma$ and $\Delta \log \epsilon$ in the true stress and true strain respectively, the ratio between these increments being the angular coefficient $\Delta \log \sigma / \Delta \log \epsilon$ of the log true stress/log true strain curve;
f. continuously checking whether the relationship connecting $\Delta \log \sigma$ , $\Delta \log \epsilon$ , and a given value P , is $\Delta \log \sigma \, \Delta \log \epsilon < P$ or $\Delta \log \sigma / \Delta \log \epsilon > P$; and
g. recording the value of the elongation when a change occurs from the first to the second relationship.

In the case of mild steels, the termination of the yield elongation range is advantageously established when the angular coefficient $\Delta \log \sigma / \Delta \log \epsilon$ exceeds a given value P between 0.15 and 0.3, the increment $\Delta \log \epsilon$ being a fixed number between 0.03 and 0.06.

The yield elongation may advantageously be chosen as equal to the elongation up to the point at which the angular coefficient $\Delta \log \sigma \, \Delta \log \epsilon$ exceeds the given value P predetermined in accordance with the nature of the metal.

Also, the scrutiny of the values reached by the angular coefficient is preferably not started until after the 0.2 percent proof stress has been exceeded. The 0.2 percent proof stress is commonly determined on a stress/strain graph by constructing a line parallel to the rectilinear part of the stress/strain curve in the elastic range in which the stresses vary according to Hooke's law. This parallel line passes through the point having the following co-ordinates : stress = 0, elongation = 0.2 percent. The value of the 0.2 percent proof stress (the stress at 0.2 percent of permanent elongation) is equal to the ordinate of the point of intersection of the straight line with the tensile curve.

In the case in which, after an initial scrutiny of the value of the angular coefficient $\Delta \log \sigma / \Delta \log \epsilon$ , it is observed that this value is greater than the given value predetermined in accordance with the nature of the metal, a complementary scrutiny is performed in the same conditions to verify that there has not been a variation induced by fortuitous causes, and if a value of the angular coefficient greater than the given value is obtained again, the conclusion drawn is that there is no yield elongation range.

The invention will be described further, by way of example only with reference to the sole FIGURE of accompanying drawing, showing a block diagram of a circuit for determining yield elongation.

Before the circuit is described in detail, its operation will be outlined. The determination of the yield elongation is effected by way of incrementation and the use of track and hold devices, being memories 6,7,19,20. The memories 6,7 receive log $\epsilon$ as an input signal, and the memories 19,20 receive log $\sigma$. Initially, the memories 6 and 19 are blocked and store (log $\sigma$ )$_1$ and (log $\sigma$ )$_1$, respectively, corresponding to a point on the tensile curve. As elongation increases they remain blocked, while the memories 7 and 20 follow log $\epsilon$ and log $\sigma$ respectively.

A module 9 subtracts log $\epsilon$—(log $\epsilon$)$_1$; this difference is compared with a value $\Delta$ log $\epsilon$ previously fixed for the increment. When this value is reached, the states of the memories 6,7 and the memories 19,20 are reversed (i.e. memories 6, 7 are unblocked and memories 19, 20 are blocked); this reversal of states continues until the end of the tensile test.

For the memories 19,20 the difference log $\sigma$—(log $\sigma$ )$_1$ is compared with a value P. $\Delta$ log $\epsilon$ ; P is a value fixed for the angular coefficient $\Delta$ log $\sigma$ / $\Delta$ log $\epsilon$ to represent the end of the yield elongation. This comparison is precisely equivalent to comparing [log $\sigma$ — (log $\sigma$ )$_1$] $\Delta$ log $\epsilon$ with P. When the difference equals P. $\Delta$ log $\epsilon$ , a memory 24 recording the elongation is blocked.

In detail, the circuit is as follows:

The output signal of the elongation transducer 1 is transmitted to an analog summator 3 which also receives a signal representing unity from a potentiometer 2, so that the summator 2 output signal represents the term (1 + A), where A is the elongation. The summator 3 output signal is fed into a function generator 4 providing the expression $\epsilon$ = ln (1 + A), the output signal of the function generator 4 being transmitted in its turn to a second function generator 5 providing the term log $\epsilon$.

The signal log $\epsilon$ is transmitted to a blocked analog memory 6, that is to say it stores only the last value of the term log $\epsilon$ memorized prior to blocking. The signal log $\epsilon$ is also transmitted to an unblocked analog memory 7, that is to say it records the successive values of log $\epsilon$ ; the signs of the successive values of log $\epsilon$ are reversed in a reversing module 8. The output signals of module 8 and the memory 6 are fed into a summator 9, whose output represents the difference $\Delta$ log $\epsilon$ between the successive values of log $\epsilon$ originating from the memory 7 and the value stored by the memory 6. This difference is compared with a reference value set by a potentiometer 10, by means of a comparator 11.

When this difference is equal to the reference value, the output signal of the comparator 11 is employed to cause reversal of the state of the memories 6 and 7 (the memory 6 is unblocked and the memory 7 is blocked and stores only the last value of the term log $\epsilon$ prior to blocking) and to change the sign of the reference voltage for the comparator 11, since the reversal of the state of the memories 6 and 7 has caused reversal of the sign of the difference obtained at the input of the summator 9.

At the output of the load (F) transducer 12, the signal obtained is transmitted to an analog divider 14, which also receives a signal, representing the width $e_o$ of the testpiece prior to the test, from a potentiometer 13, this divider 14 then providing a signal representing F/$e_o$. The output signal of the divider 14 is then fed into a second analog divider 16, which also receives a signal, representing the thickness $L_o$ of the testpiece prior to testing, from a potentiometer 15, this divider 16 then providing a signal representing F/$S_o$ referred to as the resistance to deformation.

The signal F/$S_o$ is transmitted to an analog multiplier 17, which also receives the signal representing the term (1 + A) originating from the summator 3; at the output of the multiplier 17, a signal is obtained which represents the expression (1 + A) F/$S_o$, that is to say the true stress $\sigma$. The signal $\sigma$ is fed into a function generator 18 providing the term log $\sigma$. The signal log $\sigma$ is transmitted from the output of the function generator 18 to blocked analog memory 19, which stores the last value of log $\sigma$ memorized prior to blocking, and to an unblocked analog memory 20.

The difference $\Delta$ log $\sigma$ between the successive values of log $\sigma$ originating from the memory 20 and value stored by the memory 19 is calculated by a summator 21 including a reversing module (not shown). This difference is compared with a reference value P $\Delta$ log $\epsilon$ set displayed by a potentiometer 22, by means of a comparator 23, the state of the memories 19 and 20 (blocked and unblocked alternately) being analogous to that of the memories 6 and 7 respectively,. When this difference $\Delta$ log $\sigma$ is equal to or greater than the reference value, the output signal of the comparator 23 is transmitted to a memory 24 linked to the elongation transducer 1, the state of the output signal of the comparator 23 being such that the memory 24 is blocked on the value of the elongation memorized at the moment of blocking and which represents the yield elongation sought.

For the purpose of causing reversal of the state of the memories 6 and 7 and of causing reversal of the sign of the reference voltage for the comparator 11, a signal representing double the value of the signal from the potentiometer 10 is fed to the comparator 11, this signal being set up by means of a potentiometer 25 separated from the comparator 11 by a switch 26. Two electrical connections are established between the output of the comparator 11 and the memories 6 and 7, in such manner that these connections are the carriers of voltages commonly denoted by the symbols 1-0 and 0-1, that is to say: when the difference $\Delta$ log $\epsilon$ fed into the comparator 11 is equal to the signal from the potentiometer 10, the electrical connection between the comparator 11 and the memory 6 is traversed by a current having the voltage 1, with the effect of unblocking the memory 6 and of causing it to record the successive values of log $\epsilon$, whereas the electrical connection between the comparator 11 and the memory 7 is traversed by a current having the voltage 0, with the effect of blocking the memory 7 and of actuating the switch 26 to place the potentiometer 25 in contact with the comparator 11, which has the result of reversing the sign of the reference voltage for the comparator in accordance with the reversal of the sign of $\Delta$ log $\epsilon$ caused by the reversal of the state of the memories 6 and 7; thereafter, when the new difference $\Delta$ log $\epsilon$ fed into the comparator 11 is equal to the signal from the potentiometer 25 minus the signal from the potentiometer 10, the electrical connection between the comparator 11 and the memory 6 is traversed by a current having the voltage 0 with the result of blocking the memory 6, whereas the electrical connection between the comparator 11 and the memory 7 is traversed by a current having the voltage 1, with the result of unblocking the memory 7 and of actuating the switch 26 to isolate the potentiometer 25 from the comparator 11.

So as not to begin the scrutiny of the values reached by the angular coefficient $\Delta \log \sigma / \Delta \log \epsilon$ until after the elastic limit corresponding to an elongation of 0.2 percent has been determined, and so as to synchronize the operation of the memories 6, 7 in respect of the term $\log \epsilon$ with that of the memories 19, 20 in respect of the term $\log \sigma$, two OR gates 27 and 28 are employed. Each comprises two inputs and one output, and provides an output signal of voltage 1 only when one of the two input signals is a voltage 1. The OR gate 27 is in the electrical circuit connecting the comparator 11 to the memory 6, and the OR gate 28 is in the electrical circuit connecting this comparator 11 to the memory 7.

One of the two inputs of these gates 27, 28 is the output of the comparator 11. The second input is the output of a comparator 29 supplying an output signal depending on the 0.2 percent proof stress of the metal; the output signal is a voltage 1 for as long as 0.2 percent proof stress is not reached, which allows the OR gates 27 and 28 to transmit a signal having the voltage 1 to the memories 6 and 7, which then both record the successive values of the term $\log \epsilon$ irrespective of the current originating from the comparator 11. As soon as the 0.2 percent proof stress is reached, the output signal of the comparator 29 is a current having the voltage 0, which causes the output signal of the gates 27 and 28, as well as the state of the memories 6 and 7 to depend on the output of the comparator 11, and thus allows the initiation of the process of calculation of the difference $\Delta \log \epsilon$ and of the comparison of this difference with the appropriate reference value.

The outputs of the OR gates 27 and 28 are also connected, respectively, to the analog memories 19 and 20, so that the incremental steps $\Delta \log \sigma$ and $\Delta \log \epsilon$ proceed in perfect synchronism.

The present invention equally relates to a device for the application of the process described in the foregoing.

The device, forming the object of the present invention, is essentially characterized in that it comprises, on the one hand, a traction mechanism equipped with gauges for the load, elongation and variations in width of the base of measurement of the sample exposed to the traction test and, on the other hand, an array of electronic modules, preferably built up from analogical calculation elements, this array being connected to the gauges of the traction mechanism and being arranged in such manner as to obtain the length of the range of elongation of the metal forming the sample, from the signals received from the said gauges.

We claim:

1. An automated process for determining the yield elongation of a metallic substance, comprising:
   a. subjecting a testpiece of the substance to a tensile test;
   b. continuously measuring the elongation, load, and width of the testpiece;
   c. continuously calculating the true stress, $\sigma$, and the true strain, $\epsilon$;
   d. continuously calculating $\log \sigma$ and $\log \epsilon$;
   e. continuously calculating simultaneous increments $\Delta \log \sigma$ and $\Delta \log \epsilon$ in the true stress and true strain respectively, the ratio between these increments being the angular coefficient $\Delta \log \sigma / \Delta \log \epsilon$ of the log true stress/log true strain curve;
   f. continuously checking whether the relationship connecting $\Delta \log \sigma$, $\Delta \log \epsilon$, and a given value P, is $\Delta \log \sigma / \Delta \log \epsilon < P$ or $\Delta \log \sigma / \Delta \log \epsilon > P$; and
   g. recording the value of the elongation when a change occurs from the first to the second relationship.

2. An automated process as claimed in claim 1, in which when the metallic substance is a mild steel, the given value P is between 0.15 and 0.3, and the increment $\Delta \log \epsilon$ is a fixed number between 0.03 and 0.06.

3. An automated process as claimed in claim 1, in which the yield elongation is equal to the elongation up to the point at which $\Delta \log \sigma / \Delta \log \epsilon$ becomes greater than P.

4. An automated process as claimed in claim 1, in which the checking of said relationship is not carried out until after the 0.2 percent proof stress has been reached.

5. An automated process as claimed in claim 4, further comprising in the case in which initial checking of the said relationship indicates that $\Delta \log \sigma / \Delta \log \epsilon$ is greater than P, the step of performing a further test under the same conditions, whereby if the same indication is obtained, the conclusion is drawn that there is no yield elongation.

6. A process for determining the yield elongation of a metallic substance, comprising:
   a. transmitting a signal representing the elongation, A, to a summator which also receives a signal representing numerical unity from a first potentiometer, the summator providing a signal representing the term $(1 + A)$;
   b. transmitting the summator output signal to a first function generator providing the expression $\epsilon = \ln(1 + A)$, and transmitting a signal representing $\epsilon$ from the first function generator to a second function generator providing a term $\log \epsilon$;
   c. transmitting the second function generator output signal representing $\log \epsilon$ to a blocked first memory, and to an unblocked second memory, which records the successive values of $\log \epsilon$;
   d. reversing the sign of the $\log \epsilon$ signals from the second memory by means of a reversing module;
   e. calculating the difference between the values of $\log \epsilon$ recorded by the unblocked second memory and the value stored by the first memory by transmitting the reversing module output and first memory output to a summator providing a signal representing the difference;
   f. comparing the said difference with a given value provided by a second potentiometer, by means of a first comparator;
   g. when this difference becomes equal to the given value, using the output signal of the first comparator on the one hand to cause reversal of the state of the first and second memories so that the first memory which had retained solely the last value of the term $\log \epsilon$ memorized prior to blocking is unblocked and thereafter records the successive values of $\log \epsilon$ whereas the second memory which had recorded the successive values of $\log \epsilon$ prior to blocking is blocked and stores solely the last value of the term log $\epsilon$ prior to blocking, and on the other hand to change the sign of the given value supplied to the first comparator;

h. transmitting a signal representing the load F to a divider which also receives a signal representing the width of the testpiece prior to extension from a third potentiometer;

i. transmitting the output signal of the divider to a second divider which also receives a signal representing the other dimension of the testpiece prior to extension from a fourth potentiometer, this second divider then providing a signal representing the expression $F/S_o$, where $S_o$ is the initial cross-section of the testpiece;

j. transmitting the signal representing $F/S_o$ to a multiplier module which also receives the signal representing the term $(1 + A)$ originating from the summator, whereby a signal representing the expression $F(1 + A)/S_o$, that is to say the true stress $\sigma$, is obtained at the output of the multiplier;

k. transmitting the signal representing $\sigma$ to a function generator providing the term $\sigma$;

l. transmitting the signal log $\sigma$ to a blocked third memory, and to an unblocked fourth memory which records the successive values of log $\sigma$;

m. calculating the difference between the successive values of log $\sigma$ originating from the fourth memory and the value stored by the third memory by means of a summator;

n. comparing this last-mentioned difference with a given value displayed by a fifth potentiometer, by means of a second comparator module, the state of the third and fourth memories, that is to say, blocked and unblocked alternately, being analogous to that of the first and second memories respectively;

o. when this difference is equal to or greater than the given value, transmitting an output signal from the second comparator to a fifth memory receiving a signal representing the elongation, the state of the output signal of the second comparator being such that the memory is blocked on the value of the elongation memorized immediately before blocking, which value represents the yield elongation.

7. A process as claimed in claim 6, including, to cause reversal of the state of the first and second memories and reversal of the sign of the reference voltage for the first comparator;

i. feeding a signal representing twice the value of the said reference voltage into the first comparator module, the last-mentioned signal being provided by a sixth potentiometer separated from the first comparator by a switch, the output point of the first comparator being connected to the first and second memories to supply respective voltages denoted by the symbols 1-0 and 0-1;

ii. when the signal representing the differences $\Delta$ log $\epsilon$ fed into the first comparator becomes equal to the value of the reference voltage for the first comparator (a) transmitting from a first output of the first comparator to the first memory a voltage 1 having the effect of unblocking the first memory and (b) transmitting from a second output of the first comparator to the second memory, a voltage 0 having the effect of blocking the second memory and of actuating the switch to connect the sixth potentiometer to the first comparator, which has the result of reversing the sign of the reference voltage of the first comparator simultaneously with the reversal of the sign of the difference $\Delta$ log $\epsilon$ caused by the reversal of the state of the first and second memories, and thereafter iii. when the new difference $\Delta$ log $\epsilon$ fed into the first comparator becomes equal to the value of the reference voltage provided by the sixth potentiometer minus the value of the reference voltage provided by the second potentiometer, (a) transmitting from the first comparator to the first memory a voltage 0 having the effect of blocking the first memory, and (b) transmitting from the first comparator to the second memory a voltage 1 having the effect of unblocking the second memory and of actuating the switch to isolate the sixth potentiometer from the first comparator, which has the result of restoring the initial reference voltage to the first comparator simultaneously with the reversal of the state of the first and second memories.

8. A method as claimed in claim 6, including, for the purpose of delaying the checking of the said relationship until after the 0.2 percent proof stress has been reached, i. transmitting the first output of the first comparator to a first OR gate, which provides a voltage 1 only when one of its two inputs receives a voltage 1 and the other input receives a voltage 0, and otherwise provides a voltage 0;

ii. transmitting the second output of the first comparator to a second OR gate similar to the first OR gate;

iii. transmitting the output of a third comparator to both OR gates, the third comparator providing a voltage 1 so long as the 0.2 percent proof stress is not reached, and providing a voltage 0 when the 0.2 percent proof stress is reached;

iv. transmitting the output of the first OR gate to the first and third memories; and v. transmitting the output of the second OR gate to the second and fourth memories.

9. Apparatus for determining the yield elongation of a metallic substance in the form of a testpiece, comprising:

a. a tensile test machine having means for measuring the elongation, load, and width of the testpiece;

b. automatic means for calculating the logarithm of the true stress, log $\sigma$, connected to the output of the elongation measuring means and the output of the load measuring means, c. automatic means for calculating the logarithm of the true strain log $\epsilon$ connected to the output of the elongation measuring means;

d. automatic means for calculating simultaneous increments $\Delta$ log $\sigma$ and $\Delta$ log $\epsilon$ in the true stress and true strain respectively;

e. automatic means for comparing $\Delta$ log $\sigma$ with P $\Delta$ log $\epsilon$, where P is a given value; and f. automatic means for recording the elongation, connected to the output of the elongation measuring means and to the output of the ratio calculating and comparing means, the recording means being actuated to store the elongation when $\Delta$ log $\sigma$ become at least equal to P $\Delta$ log $\epsilon$.

* * * * *